Aug. 28, 1956 J. K. GAYLORD ET AL 2,761,035
MOUNTING MEANS FOR SPEED RESPONSIVE SWITCH
Filed Dec. 23, 1953
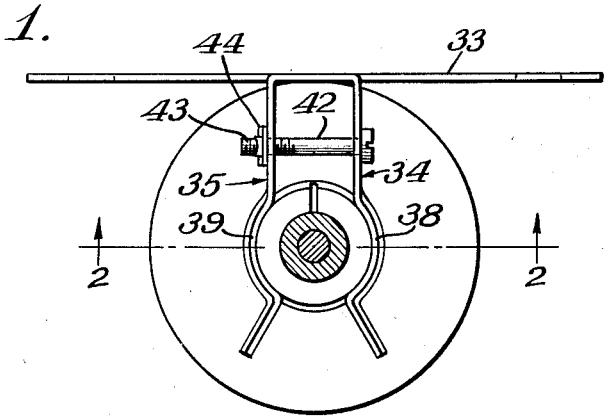
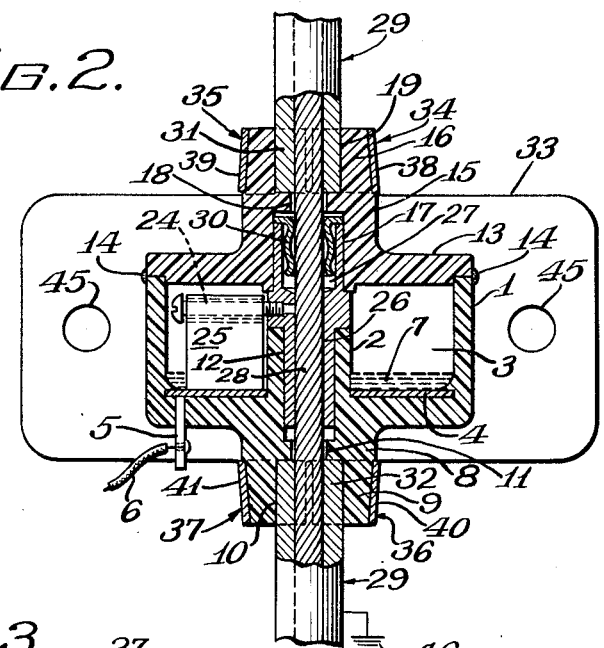
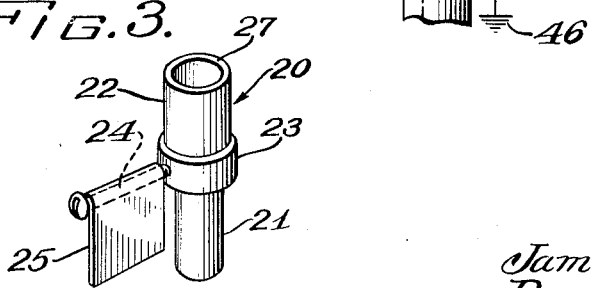
Inventors:
James K. Gaylord
Paul T. Hahn
Lewis E. Thatcher
By Gary, Desmond & Parker Attys United States Patent Office 2,761,035
Patented Aug. 28, 1956

2,761,035

MOUNTING MEANS FOR SPEED RESPONSIVE SWITCH

James K. Gaylord, Lewis E. Thatcher and Paul T. Hahn, Chicago, Ill., assignors to Gaylord Products, Incorporated, Chicago, Ill., a corporation of Delaware Application December 23, 1953, Serial No. 399,990

2 Claims. (Cl. 200—80)

This invention relates to improvements in a speed responsive electric switch which is particularly adaptable for use with the speedometer cable of an automotive vehicle, whereby an electric circuit, including the switch, may be controlled in response to movement of the automotive vehicle.

In automotive vehicles having automatic transmissions, creeping of the vehicle, that is, slow unintended movement of the vehicle at idling speeds, frequently occurs. In automotive vehicles with conventional manual transmissions and also vehicles having automatic transmissions unintended movement of the vehicle also frequently occurs when the vehicle comes to a stop on an incline or hill. Such unintended movement, whether due to creeping or due to an incline or hill, is undesirable and so-called anti-creep or hill-holding devices have heretofore been employed to prevent such unintended movement. One form of anti-creep and hill-holding device comprises a solenoid operated valve interposed in the hydraulic brake line of the vehicle, the solenoid being in series with a suitable electric switch operable with the vehicle accelerator and a control unit (essentially an electric switch) which is responsive to movement of the vehicle.

The present invention is particularly directed to a control unit which operates in accordance with the concepts disclosed in copending application for Letters Patent Serial No. 308,085, filed September 5, 1952, in the name of Lewis E. Thatcher, and which issued as Patent No. 2,678,977 on May 18, 1954.

The control unit disclosed in said application for Letters Patent is adapted to operate in response to movement of the speedometer cable of the automotive vehicle and the present invention is an improvement on the disclosed control unit.

One of the difficulties involved in installing anti-creep devices upon existing vehicles resides in associating the control unit with the speedometer cable. The present invention is directed particularly to a control unit construction which greatly simplifies this task.

Briefly described the control unit of the present invention, that is, the speed-responsive switch comprises a housing for carrying a body of non-conducting liquid in which a pivoted vane is adapted to dip, the vane being pivotally carried by a rotating element in the housing. The sheath of the speedometer cable is opened and a portion thereof cut away to leave two spaced ends. The speedometer cable is threaded through and secured to the rotating element in the housing and the top and bottom walls of the housing carry clamps which engage the spaced ends of the cable sheath. Thus, the housing is secured to the cable sheath while the cable passes in operative relationship to the rotating element of the switch in the housing. The housing may then be sealed in substantially liquid-tight relationship.

Other objects, advantages and features of the present invention will be apparent from the accompanying drawing and following detailed description.

In the drawing, Fig. 1 is a top plan view of the improved speed-responsive switch.

Fig. 2 is a sectional view taken on line 2—2 of Fig. 1.

Fig. 3 is a detailed perspective view of the rotating element of the switch.

Referring in detail to the drawing, 1 indicates a substantially cup-shaped housing having an upwardly extending centrally disposed boss 2 whereby the housing is provided with an annular space 3. The housing 1 is constructed of insulating material such as hard rubber, resin or the like. A conductive metal disc 4 is positioned at the bottom of the annular space 3 and is connected to the exterior of the housing by buss-bar 5, which, in turn, may be connected to an external circuit (not shown), to be controlled by the switch, by conductor 6. A non-conductive liquid 7 is adapted to be positioned within space 3 above the plate or disc 4.

The housing 1 carries a downwardly extending portion 8 which terminates in a split-collar 9. The split collar 9, the downwardly extending portion 8 and the boss 2 are provided with connecting bores 10, 11 and 12, respectively, for the reception of the moving element with which the switch is responsive, as will be hereinafter more fully described.

The housing 1 also carries a removable closure 13 which, when the switch is assembled in operative position, may be sealed, as at 14, to the side wall of the housing at its mouth. The closure 13 carries an upwardly extending portion 15 which terminates in a split collar 16, similar to collar 9. The closure, proper, and the upwardly extending portion 15 are provided with a relatively enlarged bore 17 and a relatively small diameter bore 18, and the collar 16 is provided with a connecting bore 19.

A rotating element 20, shown in detail in Fig. 3, comprises a tubular member having at one end portion, the lower end portion 21, a relatively restricted diameter, and at the other end portion, the upper end portion 22, a relatively enlarged diameter. An annular projection 23 divides the upper end portion from the lower end portion. The lower end portion 21 is adapted to be positioned in bore 12 provided in the boss 2 in which it is adapted to rotate, the projection 23 resting upon the upper portion of the boss 2. A screw 24 is threaded radially into the annular projection 23 and a vane 25 is pivotally carried upon said screw, the free edge of said vane dipping in the liquid 7 and being in contact with plate or disc 4 when the element 20 is stationary.

The lower end portion 21 and the annular projection 23 are provided with connecting bores 26 and the upper end portion 22 is provided with a relatively enlarged bore 27 which connects with bores 26. The reference numeral 28 indicates a conventional, flexible, speedometer cable carried within the usual flexible sheath 29. When the device is associated with the speedometer cable 28, the cable is threaded through the bores 26 and 27 and through a resilient friction gripping member 30 which frictionally grasps the cable 28 and also frictionally grasps the inner surface of the enlarged bore 27 in the upper end portion of the element 20. Thus, the element 20 is rigidly positioned upon the speedometer cable and rotates therewith in the bores 12 and 17.

The sheath 29 is severed and a portion thereof is removed where the cable passes through the housing 1 and closure extension 15, thus providing two spaced end portions, respectively, of the sheath 29. As will be hereinafter more fully described, the end portion 31 is positioned in bore 19 of collar 16 and the end portion 32 is positioned in bore 10 of collar 9 in which said end portions are respectively clamped.

A mounting plate 33 is adapted to carry the control unit, said mounting plate carrying a pair of spaced resilient arms 34 and 35 adjacent its top and a similar pair of arms 36 and 37 adjacent its bottom, the respective pairs of arms being spaced from each other. The arms 34 and 35, intermediate their length are bowed outwardly to form clamping members 38 and 39 respectively and in similar fashion arms 36 and 37 carry clamping members 40 and 41, respectively. Intermediate plate 33 and the clamping members 38 and 39 a bolt 42 engages said arms, said bolt being provided with threads 43 engageable by nut 44 whereby said clamping members may be drawn toward each other. A similar arrangement (not shown) associates arms 36 and 37 together.

To mount the control unit upon the plate 33 the clamping members 38 and 39 embrace the split collar 16 and the clamping members 40 and 41 embrace the split collar 9; the nut and bolt arrangement associated with the respective arms are then tightened whereby the housing 1 and closure 13 are securely held by the mounting plate 33. The mounting plate is provided with apertures 45 whereby said plate may be secured to a suitable supporting wall (not shown) preferably a vertical wall of the automotive vehicle.

In view of the fact that the plate 4 is constructed of electrically conductive material, vane 25 is constructed of conductive material, as is also the rotating element 20, a complete electrical circuit is formed between conductor 6 to the cable 28 and sheath 29, which latter may be grounded, as at 46 in Fig. 2. Thus, conductor 6 may be connected to an external circuit which may comprise an accelerator switch, a solenoid operated valve, and a source of current which may have one side grounded. This would constitute the circuit of a conventional anti-creep or hill-holding device.

The control unit comprising the present invention operates in the manner described in the hereinbefore identified application for patent, that is, when the element 20 is stationary, the free edge of vane 25 makes contact with plate 4 and thus the circuit is completed. When the speedometer cable rotates at a predetermined speed, the frictional deflecting force of the liquid 7 upon the vane causes the vane to cant about its pivot or hinge, that is, about screw 24 and the free edge of the vane breaks contact with plate 4 thus opening the circuit.

It is apparent that the present invention contemplates a convenient and efficient arrangement for associating a speed-responsive switch with a speedometer cable wherein expensive couplings, connecting parts and the like are not necessary. Of course, the cable with which the switch is associated need not necessarily be a speedometer cable, since the advantages of the invention will be inherent wherever such a switch is to be associated with a sheathed rotating cable regardless of the ultimate function of the cable.

We claim as our invention:

1. In a speed-responsive switch of the type having a rotating actuating element for controlling an electric circuit in response to the rotation of a sheathed rotating member, the combination with said rotating actuating element and said sheathed rotating member of a housing for containing said element, a closure for said housing, a resilient clamping collar carried by said housing and a resilient clamping collar carried by said closure for engaging spaced end portions of said sheath, said closure and said housing being provided with openings through which said rotating member is adapted to extend, means for frictionally clamping said actuating element upon said rotating member within the closure of said housing to rotate said actuating element, and clamping means engageable with said clamping collars of said closure and housing to clamp said collars upon the spaced end portions of said sheath.

2. In a speed-responsive switch of the type having a rotating actuating element for controlling an electric circuit in response to the rotation of a sheathed rotating cable, the combination with said rotating actuating element and said sheathed rotating cable of a housing for containing said element, a closure for said housing, a split clamping collar integrally carried by said housing and a split clamping collar integrally carried by said closure for engaging spaced end portions of said sheath, said closure and said housing being provided with openings through which said rotating cable is adapted to extend between the spaced end portions of said sheath, means for engaging said actuating element and said rotating member within the closure of said housing to rotate said actuating element, and a support for said switch comprising clamping arms engageable with said split collars of said closure and housing to clamp said collars upon the spaced end portions of said sheath.

References Cited in the file of this patent
UNITED STATES PATENTS

| | | |
|---|---|---|
| 2,319,107 | Brandt | May 11, 1943 |
| 2,601,142 | Hubbard | June 17, 1952 |